(12) United States Patent
Komatsuki et al.

(10) Patent No.: US 8,871,382 B2
(45) Date of Patent: Oct. 28, 2014

(54) BATTERY

(75) Inventors: Masato Komatsuki, Hashima-gun (JP); Hiroki Nagai, Nagoya (JP); Yoichi Naruse, Nagoya (JP); Hiroya Kondou, Toyohashi (JP); Kaoru Yugahara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 563 days.

(21) Appl. No.: 12/937,740

(22) PCT Filed: Apr. 8, 2009

(86) PCT No.: PCT/JP2009/057199
§ 371 (c)(1),
(2), (4) Date: Oct. 14, 2010

(87) PCT Pub. No.: WO2009/128375
PCT Pub. Date: Oct. 22, 2009

(65) Prior Publication Data
US 2011/0039154 A1 Feb. 17, 2011

(30) Foreign Application Priority Data
Apr. 18, 2008 (JP) .................................. 2008-109231

(51) Int. Cl.
*H01M 2/08* (2006.01)
*H01M 2/36* (2006.01)
*H01M 10/0525* (2010.01)

(52) U.S. Cl.
CPC .......... *H01M 2/362* (2013.01); *H01M 10/0525* (2013.01); *H01M 2/367* (2013.01); *Y02E 60/12* (2013.01); *Y02T 10/7011* (2013.01)
USPC ...................................................... 429/185

(58) Field of Classification Search
USPC ........................................................ 429/185
See application file for complete search history.

(56) References Cited

U.S. PATENT DOCUMENTS

| 2004/0161666 A1* | 8/2004 | Haas et al. ..................... 429/185 |
| 2006/0024573 A1* | 2/2006 | Yim et al. ...................... 429/174 |
| 2006/0257733 A1* | 11/2006 | Kim et al. ..................... 429/185 |

FOREIGN PATENT DOCUMENTS

| JP | 2000-21437 | 1/2000 |
| JP | 2000-106156 | 4/2000 |
| JP | 2000106156 A * | 4/2000 |
| JP | 2003-187760 | 7/2003 |
| JP | 2006-12829 | 1/2006 |
| JP | 2006-324244 | 11/2006 |
| JP | 2007-157350 | 6/2007 |

OTHER PUBLICATIONS

International Search Report in International Application No. PCT/JP2009/057199; Mailing Date: Jul. 28, 2009.

* cited by examiner

*Primary Examiner* — Ula C Ruddock
*Assistant Examiner* — Daniel Gatewood
(74) *Attorney, Agent, or Firm* — Finnegan, Henderson, Farabow, Garrett & Dunner, LLP

(57) ABSTRACT

A battery is equipped with a case (200) in which a fill opening (aperture) (201) is formed and a sealing cap (210), which closes the fill opening (201) formed in the case (200). The sealing cap (210) is formed of a thin plate that covers the fill opening (201) in the case (200), the circumferential edge (211) of the sealing cap (210) is bonded to the case (200), and the center (212) of the sealing cap (210) is bent from the circumferential edge (211) and bulges up toward the outside of the case (200). In addition, a chamfer (213) is applied at the bent corner of the sealing cap (210).

9 Claims, 7 Drawing Sheets

BATTERY

TECHNICAL FIELD

This invention relates to a battery, and for example relates to a battery structure that can be applied to a secondary battery used as a vehicle power supply. This application claims priority based on Japanese Patent Application No. 2008-109231 filed on Apr. 18, 2008, and the entire disclosure thereof is hereby incorporated herein by reference.

BACKGROUND ART

A battery, such as a lithium-ion secondary battery, has a wound electrode body that is housed in a case (battery case, outer case). A pouring hole for pouring electrolyte is formed to the case of such a battery. After electrolyte is poured in, the pouring hole is closed. This closure of the pouring hole is accomplished, for example, by covering with a sealing cap, and joining the circumferential edge of the sealing cap to the case by welding or the like. Structures in which a pouring hole or other such opening (hole, aperture) formed in a case is closed off by a sealing cap have been disclosed, for example, in Patent Document 1 and Patent Document 2.

Patent Document 1 discloses a structure in which a rubber plug is installed at the upper part of the pouring hole, after which a lid is closed that has in its center a protrusion which mates with the rubber plug and has a flange around its periphery, and the flange of the lid is irradiated with a laser beam to seal the pouring hole.

Patent Document 2 discloses a structure comprising a sealing cap in which a reinforcing component that is stiffer than a thin plate component is provided to the periphery of the thin plate component. In this publication, the sealing cap functions as a safety valve, in which the thin plate component breaks when the pressure inside the case goes over a specific level.

Patent Document 1: Japanese Laid-Open Patent Application 2000-21437

Patent Document 2: Japanese Laid-Open Patent Application 2003-187760

Such batteries are frequently provided with a safety valve that opens up when the interior of the battery goes over a specific pressure, in order to prevent rupture in the event that an abnormal amount of gas is generated in the interior. In this case, the joint strength of the sealing cap needs to be high enough not to be broken by a pressure lower than the pressure at which the safety valve opens.

Also, since the battery case is sealed, a pressure differential between the inside and outside of the case may repeatedly exert pressure on the sealing cap. For example, if the temperature inside the battery case rises high, the pressure inside the case is raised due to the expansion of the air inside the case, thereby the pressure inside the case is exerted that pushes the sealing cap from the inside of the case toward the outside. When the air pressure outside the case drops, the pressure inside the case is similarly exerted that pushes the sealing cap from the inside of the case toward the outside. The above-mentioned lithium ion secondary batteries are installed in hybrid vehicles or electric automobiles, where they may be used in cold climes. When used in a cold clime, the vehicle is started in a state in which it has been cooled by the outside air, but the battery emits heat through charging and discharging while the car is running. Therefore, the temperature of the usage environment can vary widely. In this case, since the battery case is sealed, there is also fluctuation of the pressure exerted on the case by the pressure differential inside and outside the case, and the sealing cap is subjected to a load by the pressure differential inside and outside the case. Over the years, the temperature of the environment in which the battery is used varies repeatedly, so repeated load may act on the joint of the sealing cap. Accordingly, the sealing cap joint needs to be strong enough to have the required durability with respect to this repeated load.

Also, the sealing cap is joined to the case by welding, for example, but this can lead to a certain amount of variance in the weld strength caused by variance in the welding conditions. Consequently, the sealing cap joining step, joining conditions, and so forth need to be managed carefully so as to obtain the required joint strength, factoring in a certain margin of safety.

DISCLOSURE OF THE INVENTION

The present invention was conceived in light of the above situation, and proposes a structure with which the stress exerted on the joined portion of the sealing cap can be reduced.

The inventors came up with the present invention by considering that the problems encountered with batteries caused by improper joining of the sealing cap could be mitigated if the stress acting on the sealing cap joints were reduced even when pressure was exerted on the sealing cap.

The battery pertaining to the present invention comprises a case in which an opening is formed, and a sealing cap that closes the opening formed in the case. The sealing cap is formed from a thin plate that covers the opening in the case, the circumferential edge of the sealing cap is joined to the case, and the center of the sealing cap is bent from the circumferential edge and bulges up toward the outside of the case. A chamfer is applied to the bent corner of the sealing cap.

With this battery, since the chamfer is applied to the bent corner of the sealing cap, the bent corner is not as stiff as when it has not been chamfered. This means that even when pressure is exerted on the sealing cap from the inside of the case, the bent corner will be allowed to stretch so that the sealing cap expands outward. This reduces the stress applied to the joined portion of the sealing cap, and results in fewer battery problems attributable to improper joining of the sealing cap.

The sealing cap is, for example, a pressed article, in which case the chamfer of the corner may be applied by pressing. Also, the chamfer angle $\theta$ of the chamfer applied to the corner can be $30° \leq \theta \leq 60°$, using a bottom face of the circumferential edge of the sealing cap as a reference.

Also, the center may comprise a side wall component that is bent upward from the circumferential edge, and a roof component that covers an upper part of the opening in the case. In this case, if pressure is exerted on the sealing cap, the stress applied to the joined portion of the sealing cap will be reduced by deformation of the side wall component and the roof component, so there will be fewer battery problems attributable to improper joining of the sealing cap.

In this case, the roof component may be formed flat. If the roof component is flat, then when pressure is exerted on the sealing cap, the elastic curving of the roof component will lessen the stress that is applied to the joined portion of the sealing cap. Also, the roof component may be thinner than the side wall component. In this case, when t1 represents the thickness of the side wall component and t2 represents the thickness of the roof component, then it is good if $0.9t1 \geq t2 \geq 0.5t1$ is satisfied, for example. In this case, if pressure is exerted on the sealing cap, the roof component and side wall component will deform a suitable amount, the stress to which the joined portion of the sealing cap is subjected will be more effectively reduced, and there will be fewer battery problems attributable to improper joining of the sealing cap.

The battery pertaining to the present invention can constitute a secondary battery by placing electrolyte and an electrode body comprising a positive electrode and a negative electrode in the case. Furthermore, such a secondary battery can be applied to a battery that is installed in a vehicle.

Figure 1:
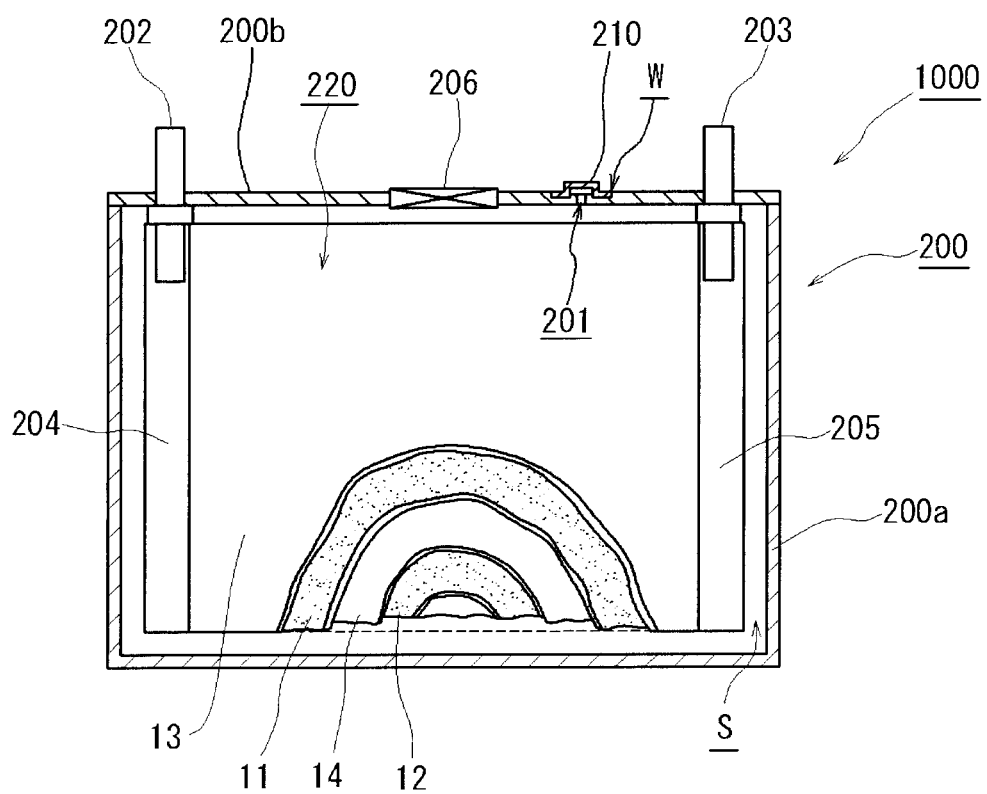
FIG. 1 is a diagram of the battery pertaining to an embodiment of the present invention.

EXPLANATION OF REFERENCE NUMERALS 200 case
201 pouring hole (opening, hole, aperture)
202 positive electrode external terminal
203 negative electrode external terminal
204 positive electrode collector
205 negative electrode collector
206 safety valve
207 groove
209 wall
210 sealing cap
211 circumferential edge
211a outer circumferential edge of sealing cap
211b bottom face of circumferential edge
212 center
213 chamfer
216 side wall component
217 roof component
220 electrode body
1000 battery
P compressor
S space
t1 thickness
t2 thickness
W joined portion
θ chamfer angle

DETAILED DESCRIPTION OF THE EXAMPLE EMBODIMENTS

The battery pertaining to an embodiment of the present invention will now be described through reference to the drawings. Those members and parts that have the same action are numbered the same. This embodiment will be described using as an example a lithium-ion secondary battery that is installed in a so-called hybrid vehicle or the like.

As shown in FIG. 1, a battery 1000 comprises a case 200 and a sealing cap 210 that closes an opening 201 formed in the case 200. In this embodiment a lithium-ion secondary battery is constituted, and electrolyte (not shown) and an electrode body 220 comprising a positive electrode and a negative electrode are housed in the case 200.

The case 200 in this embodiment is made up of a bottomed, flat, rectangular battery can 200a, and a lid 200b. The case 200 may be made from a metal material that is lightweight yet strong enough, and in this embodiment aluminum is used. The material used for the case 200 is not limited to aluminum, however, and may instead be styrene, PPS (polyphenylene sulfide resin), or another such engineering plastic. When such a plastic material is used, it can be bonded (joined) with any of various adhesives instead of by welding. In this embodiment, the opening 201 is formed in the lid 200b.

The case 200 is provided with a positive electrode external terminal 202 and a negative electrode external terminal 203. The positive electrode external terminal 202 is connected to a positive electrode collector 204 of the electrode body 220 (see FIG. 2), and the negative electrode external terminal 203 is connected to a negative electrode collector 205 of the electrode body 220 (see FIG. 2). The case 200 is also provided with a safety valve 206. In this embodiment, the opening 201 formed in the case 200 functions as a pouring hole through which electrolyte is poured. The pouring hole 201 is closed off by the sealing cap 210 after the electrolyte has been poured in. In this embodiment, there is a space S inside the case 200 even after the electrode body 220 is placed in the case 200 and the electrolyte poured in.

Figure 2:
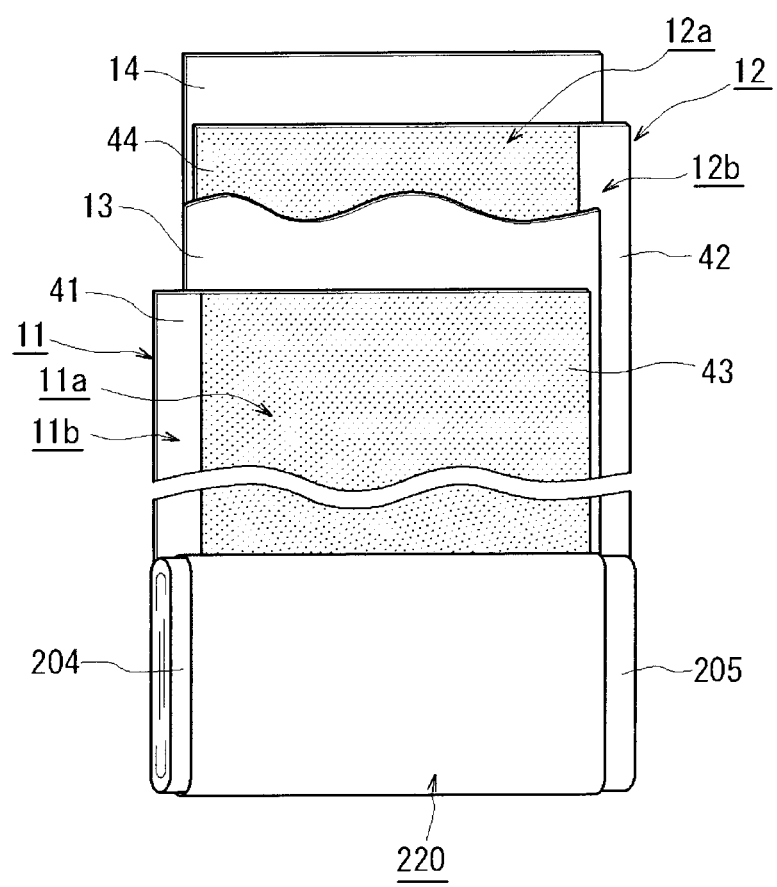
FIG. 2 is a diagram of the structure of the electrode body of the battery pertaining to an embodiment of the present invention.

As shown in FIG. 2, the electrode body 220 is made up of a positive electrode strip 11, a negative electrode strip 12, and two separator strips 13 and 14.

The positive electrode strip 11 in this embodiment has a positive electrode active substance layer 43 formed on a positive electrode collector 41 composed of aluminum foil. The positive electrode collector 41 is a member in the form of a strip. The positive electrode active substance layer 43 coats both sides of the positive electrode collector 41 except for the side edge portion on one side of the positive electrode collector 41 in the width direction. Examples of favorable positive electrode active substances that can be contained in the positive electrode active substance layer 43 include lithium manganate ($LiMn_2O_4$), lithium cobaltate ($LiCoO_2$), and lithium nickelate ($LiNiO_2$).

The negative electrode strip 12 has a negative electrode active substance layer 44 formed on a negative electrode collector 42 composed of copper foil. The negative electrode collector 42 is a member in the form of a strip. The negative electrode active substance layer 44 coats both sides of the negative electrode collector 42 except for the side edge portion on one side of the negative electrode collector 42 in the width direction. Examples of favorable negative electrode active substances that can be contained in the negative electrode active substance layer 44 include graphite, amorphous carbon, and other such carbon-based materials, and lithium-containing transition metal oxides and transition metal nitrides.

The separator strips 13 and 14 are films through which ionic substances can pass, and in this embodiment a microporous film made of ion transmissive polypropylene is used. The separator strips 13 and 14 can be impregnated with electrolyte.

The electrolyte in this embodiment is made up of a non-aqueous electrolyte such as a mixed solvent of diethyl carbonate and ethylene carbonate containing a suitable amount of a suitable electrolyte (such as $LiPF_6$ or another such lithium salt).

As shown in FIG. 2, the positive electrode strip 11 and the negative electrode strip 12 are put together with the separator strips 13 and 14 in between, and then wounded into a flattened shape. The positive electrode strip 11 and the negative electrode strip 12 are staggered with respect to each other in the width direction in a state in which the positions of the coated portions 11a and 12a of the positive electrode strip 11 and the negative electrode strip 12 coated with the positive electrode active substance layer 43 and the negative electrode active substance layer 44 are aligned. The separator strips 13 and 14 are superposed with the coated portions 11a and 12a where the positive electrode strip 11 and the negative electrode strip 12 have been coated with the positive electrode active substance layer 43 and the negative electrode active substance layer 44. Also, uncoated portions 11b and 12b where the positive electrode active substance layer 43 and negative electrode active substance layer 44 have not been applied stick out from the separator strips 13 and 14.

Although not depicted in the drawings, as mentioned above, the positive electrode strip 11, the negative electrode strip 12, and the separator strips 13 and 14 are superposed, wound in a coil, and compressed in a direction perpendicular to the winding axis into a flat shape so that the electrode body 220 will fit into the above-mentioned rectangular case 200.

As shown in FIG. 1, this battery 1000 comprises the electrode body 220 housed in the battery can 200a of the case 200. The positive electrode external terminal 202 and the negative electrode external terminal 203 provided to the lid 200b are respectively connected to the positive electrode collector 204 and negative electrode collector 205 of the electrode body 220, and the lid 200b is closed.

After this, electrolyte is poured in through the pouring hole 201 formed in the case 200 (in this embodiment, the lid 200b). After the electrolyte is poured in, charging (initial charging) is performed. During this charging, gas is generated inside the case 200 by a chemical reaction between the electrode body 220 and the electrolyte. In this embodiment, after discharge, the battery is charged again, this time in a high temperature atmosphere of about 50° C. to 60° C. Once again gas is generated by a chemical reaction between the electrode body 220 and the electrolyte. Thus, performing charging and discharging in the manufacturing process results in gas being generated by a chemical reaction between the electrode body 220 and the electrolyte. This step (called conditioning) more or less completes the generation of gas, so the generation of gas from the electrode body 220 as a result of subsequent charging and discharging can be suppressed.

In this embodiment, after the above-mentioned initial charging and discharging step (the conditioning step), the sealing cap 210 is placed over the pouring hole 201 to close the pouring hole 201.

Figure 4:
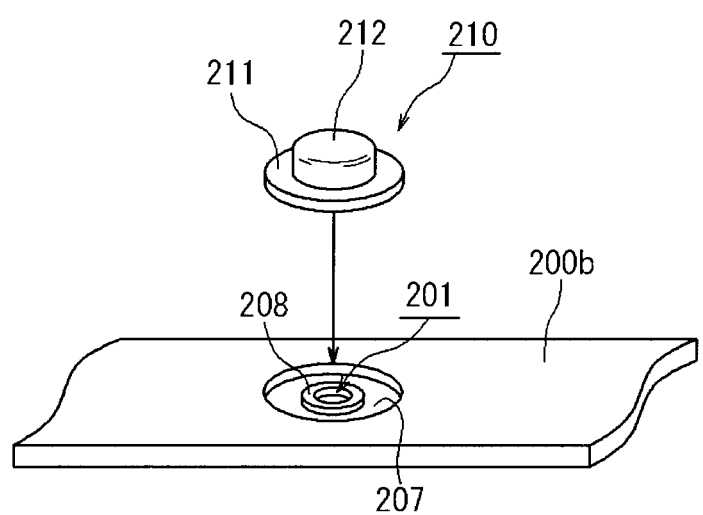
FIG. 4 is a diagram of the opening formed in the case of the battery pertaining to an embodiment of the present invention.

In this embodiment, as shown in FIG. 4, a groove 207, into which fits the circumferential edge 211 of the sealing cap 210, is formed around the pouring hole 201 of the case 200, and the pouring hole 201 is formed in a raised portion 208 on the inside of the groove 207.

Figure 3:
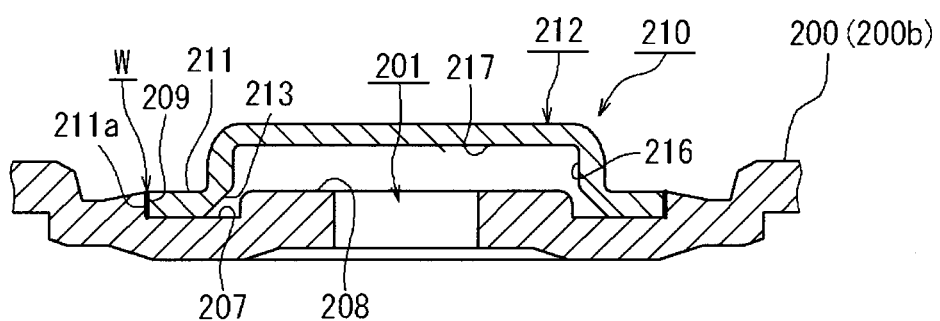
FIG. 3 is a diagram of the attachment structure of the sealing cap of the battery pertaining to an embodiment of the present invention.
Figure 5:
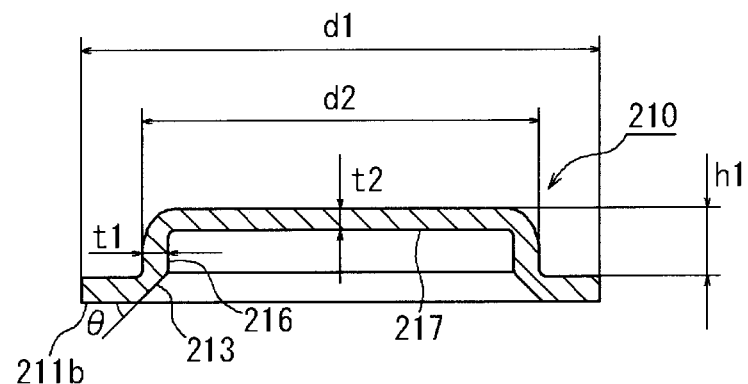
FIG. 5 is a diagram of the sealing cap of the battery pertaining to an embodiment of the present invention.

As shown in FIG. 3, the sealing cap 210 is a member that closes the pouring hole 201 by covering it. In this embodiment, the sealing cap 210 is formed from a thin plate that covers the pouring hole 201 (opening) in the case 200, and the circumferential edge 211 of the sealing cap 210 is joined to the case 200. The center 212 of this sealing cap 210 is bent from the circumferential edge 211 and bulges up toward the outside of the case 200. The bent corners are given a chamfer 213. In this embodiment, the center 212 of the sealing cap 210 is bent from the circumferential edge 211 and bulges up toward the outside of the case 200 as shown in FIG. 5. This center 212 comprises a side wall component 216 that is bent upward from the circumferential edge 211, and a roof component 217 that covers the upper part of the pouring hole 201 (opening) in the case 200. The roof component 217 is formed flat. Also, in this embodiment the thickness t2 of the roof component 217 is less than the thickness t1 of the side wall component 216.

In this embodiment, the sealing cap 210 is a member in a substantially disk form, and the center bulges up in a circular shape. The diameter d1 of the sealing cap 210 is 8 mm, and the diameter d2 of the center that bulges up in a circular shape is 6 mm. The height h by which the center 212 is bent from the circumferential edge 211 and bulges up toward the outside of the case 200 is 1 mm. The thickness t1 of the side wall component 216 is 0.4 mm, and the thickness t2 of the roof component 217 is 0.32 mm.

In this embodiment, the sealing cap 210 is made of aluminum (A1050), and is formed by pressing a thin plate. The sealing cap 210, as shown in FIG. 4, has a shape that mates with the groove 207 formed around the pouring hole 201 in the case 200.

Figure 6:
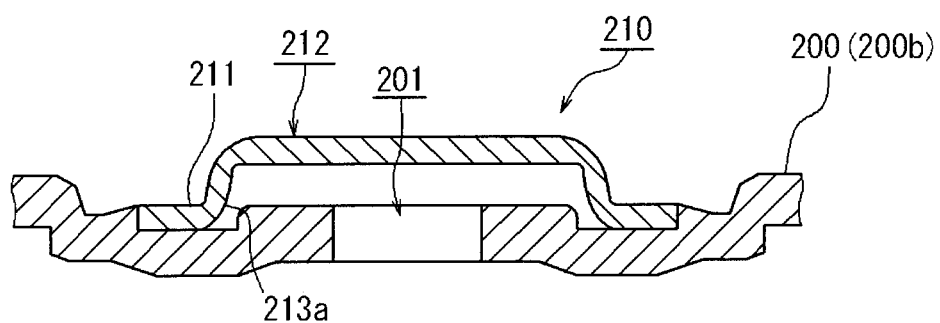
FIG. 6 is a diagram of a sealing cap that has not been chamfered.

The center 212 of this sealing cap 210 is bent from the circumferential edge 211 and bulges up toward the outside of the case 200. When a thin plate is bent by pressing, usually, as shown in FIG. 6, the outside of the bent portion is stretched out during forming, so a smooth curved surface 213a results. In this case, the corners have a shape that makes them stiffer than the other portions.

In contrast, in this embodiment the chamfer 213 is made as shown in FIG. 3 on the portions corresponding to this curved surface 213a. When this chamfer 213 is made, the corners of the sealing cap 210 become thinner, and this lowers the stiffness of the corners.

The chamfer 213 may be formed by cutting or by pressing. If it is formed by pressing, the surface shape of the die used for pressing the sealing cap 210 should be appropriately designed. Also, if the chamfer 213 is formed by pressing, the step of working the chamfer 213 can be simplified in the course of manufacturing the sealing cap 210.

In this embodiment, the above-mentioned corner stiffness is reduced by the chamfer 213. The chamfer angle θ of the chamfer 213 may be, for example, $30° \leq \theta \leq 60°$, using the bottom face 211b of the circumferential edge 211 of the sealing cap 210 as a reference. It is not really desirable for angle to be less than 30° or greater than 60° because stiffness will be high and the effect of stress reduction will be diminished. In this embodiment, the chamfer angle θ of the chamfer 213 is 45°.

Figure 7:
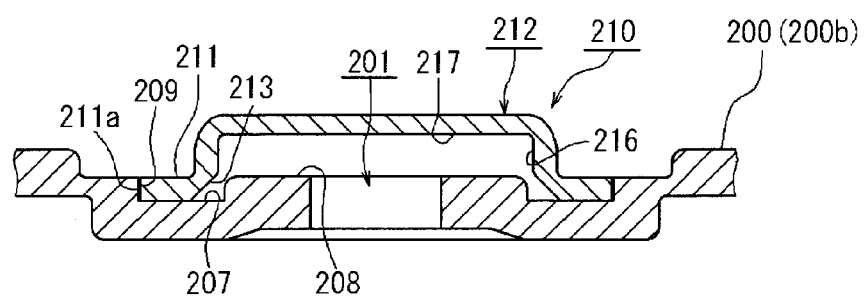
FIG. 7 is a diagram of the structure for attaching the sealing cap of the battery pertaining to an embodiment of the present invention to a case.

As shown in FIG. 7, this sealing cap 210 is placed over the pouring hole 201 by fitting the circumferential edge 211 of the sealing cap 210 into the groove 207. Here, in this embodiment, the outer circumferential edge 211a of the circumferential edge 211 of the sealing cap 210 is in close proximity to the wall 209 that forms the groove 207 around the pouring hole 201. As shown in FIG. 3, the outer circumferential edge 211a and the wall 209 are welded together while in this close proximity. This welding may be performed by YAG laser welding, for instance.

Figure 8:
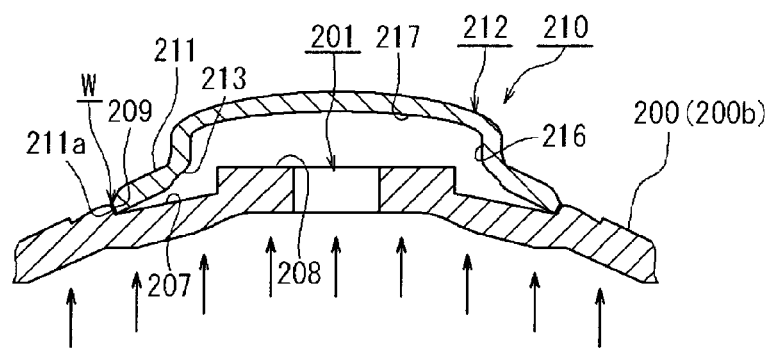
FIG. 8 is a diagram of the state in which the pressure inside the case has risen.

In this embodiment, when the battery 1000 is being used, the atmospheric pressure inside the case 200 may rise higher than the outside air pressure. If the atmospheric pressure inside the case 200 rises higher than the outside air pressure, the sealing cap 210 will deform as shown in FIG. 8, bulging outward under pressure from inside the case 200. The degree of deformation is exaggerated in FIG. 8 to make this state of deformation easier to comprehend.

In this embodiment, since the bent corners of the sealing cap 210 are given the chamfer 213, the bent corners are stiffer than if there were no chamfering, as shown in FIG. 6.

Therefore, as shown in FIG. 8, when pressure is exerted on the sealing cap 210 from inside the case 200, the bent corners will be allowed to stretch so that the sealing cap 210 deforms so as to expand outward. This reduces the stress applied to the joined portion W of the sealing cap 210, and results in fewer battery 1000 problems attributable to improper joining of the sealing cap 210. Also, even when pressure is repeatedly exerted on the sealing cap 210, since the stress applied to the joined portion W of the sealing cap 210 is reduced, there will be fewer battery 1000 problems attributable to improper joining of the sealing cap 210.

Also, in this embodiment, the center 212 that is bent from the circumferential edge 211 and bulges up toward the outside of the case 200 comprises a side wall component 216 that is bent upward from the circumferential edge 211, and a roof component 217 that covers the upper part of the pouring hole 201 (opening) in the case 200. In this embodiment, this shape, combined with the above-mentioned chamfer 213, allows greater overall deformation when the sealing cap 210 deforms so as to bulge outward under pressure from the inside of the case 200. Accordingly, there tends to be less stress applied to the joined portion W of the sealing cap 210, and battery 1000 problems attributable to improper joining of the sealing cap 210 can be reduced even more effectively.

Furthermore, in this embodiment, as shown in FIG. 5, the roof component 217 is formed flat. Since the roof component 217 is formed flat, when the sealing cap 210 deforms so that it bulges outward under pressure from the inside of the case 200, the roof component 217 will deform so as to bulge outward, which permits more of this deformation. Also, in this embodiment, the roof component 217 is thinner than the side wall component 216. The result of making the roof component 217 thinner than the side wall component 216 is that deformation of the roof component 217 permits more deformation of the sealing cap 210. Consequently, the stress applied to the joined portion W of the sealing cap 210 is more effectively reduced, and battery 1000 problems attributable to improper joining of the sealing cap 210 can be reduced even more effectively.

If there is almost no difference in the thickness of the roof component 217 and the side wall component 216, there will be little deformation of the sealing cap 210 overall, and there will be less reduction in the stress applied to the joined portion W of the sealing cap 210, compared with a case where the roof component 217 is thinner than the side wall component 216. If the roof component 217 is too much thinner than the side wall component 216, though, there will again be little deformation of the sealing cap 210 overall, and there will be less reduction in the stress applied to the joined portion W of the sealing cap 210. Accordingly, when t1 represents the thickness of the side wall component 216 and t2 represents the thickness of the roof component 217, then it is good if $0.9t1 \geq t2 \geq 0.5t1 \{(0.9 \times t1) \geq t2 \geq (0.5 \times t1)\}$ is satisfied. In this embodiment, t2 is approximately equal to $0.8t1(t2=0.8 \times t1)$.

Figure 9:
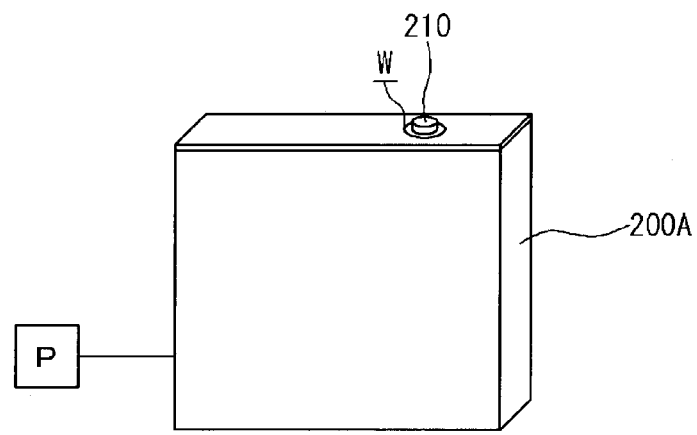
FIG. 9 is a diagram of an example of a test in which the strength of the joined portion of the sealing cap is measured.

As to the strength of the joined portion W of the sealing cap 210, as shown in FIG. 9, for example, the sealing cap 210 is joined to a test case 200A, the pressure is raised inside the case 200 with a compressor P, and the pressure at which the joined portion W breaks is measured. The resistance to repeated load may be evaluated using the same apparatus as that shown in FIG. 9, for example, on the basis of an S-N curve indicating the relation the number of repetitions until breakage and the stress amplitude when the pressure inside the case 200 is fluctuated and repeated sinusoidal stress of a constant amplitude is applied to the joined portion W until there is a fatigue break.

A battery pertaining to an embodiment of the present invention was described above through reference to the drawings, but the battery pertaining to the present invention is not limited to the embodiment given above.

Figure 10:
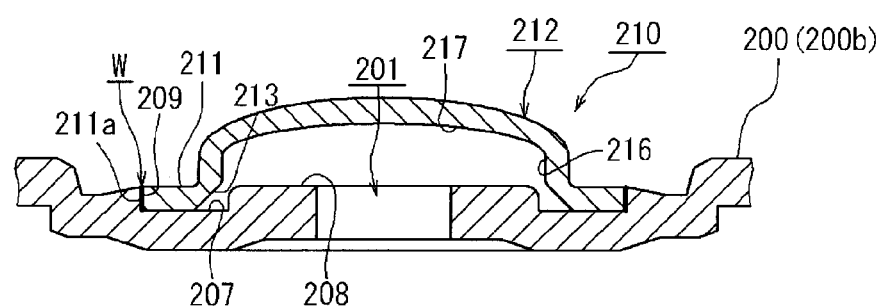
FIG. 10 is a diagram of the structure of the sealing cap of the battery pertaining to another embodiment of the present invention.

For example, in another embodiment of the present invention, the shape in which the sealing cap 210 is bent from the positive electrode strip 211 and bulges up toward the outside of the case 200 may be as shown in FIG. 10, in which the center bulges up smoothly in an approximately hemispherical surface shape. Here again, since the chamfer 213 is given to the corners of the sealing cap 210 bent from the circumferential edge 211, the sealing cap 210 is permitted to deform so as to bulge outward under pressure from the inside of the case 200. Thus, the specific shape of the sealing cap 210 can be modified as desired, taking into account the amount of deformation permitted when the sealing cap 210 deforms so as to bulge outward under pressure from inside the case 200.

The joining of the sealing cap 210 and the case was given above as joining by YAG laser welding as an example, but as discussed above, the present invention relates to a structure that relieves the stress applied to the joined portion of the sealing cap, so the joining of the sealing cap and the case is not particularly limited to YAG laser welding. Also, a joining method other than welding may be employed (such as bonding with an adhesive). Nor are the materials of the sealing cap and the case limited to those used in the above embodiment, and various materials that are used for battery cases can be employed.

In the above embodiment, as shown in FIG. 3, the groove 207 was formed around the pouring hole 201 (opening) in the case 200, and the wall 209 forming the groove 207 was joined with the outer circumferential edge 211a of the circumferential edge 211 of the sealing cap 210, but the structure of joining the sealing cap 210 is not limited to what was given above. The groove 207 need not be formed around the pouring hole 201 (opening) in the case 200. Also, the place where the circumferential edge 211 of the sealing cap 210 is joined is not limited to the outer circumferential edge 211a of the sealing cap 210. The place were the circumferential edge 211 of the sealing cap 210 is joined may be set, for example, to be more to the inside than the outer circumferential edge 211a of the sealing cap 210.

In the above embodiment, an example was given of the structure of a sealing cap attached to a pouring hole serving as an opening formed in the case of a battery, but the opening formed in the case is not limited to being the electrolyte pouring hole. For instance, the opening in the case to which the sealing cap is attached may be a gas release hole for initial charging (conditioning). The present invention can also be applied to a sealing cap structure in which various openings formed in the case of a battery are closed. Also, a lithium-ion secondary battery was given as an example of a battery structure, but the present invention can be applied to various kinds of battery. Other batteries besides a lithium ion secondary battery to which the present invention can be applied include nickel-hydrogen batteries, nickel-cadmium batteries, and so forth.

Figure 11:
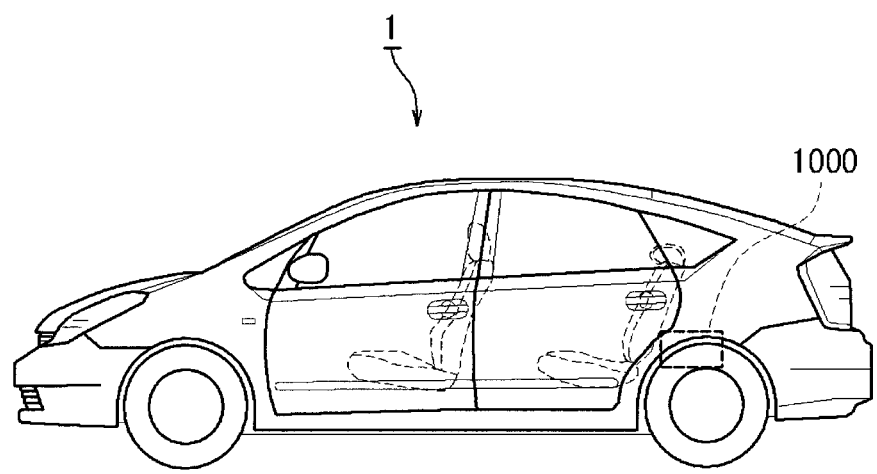
FIG. 11 is a diagram of a vehicle in which the secondary battery pertaining to an embodiment of the present invention has been installed.

Also, the present invention can extend the life of a battery by more effectively reducing the problems that occur in the battery 1000 and are attributable to improper joining of the sealing cap 210. Accordingly, the battery pertaining to the present invention can be favorably applied as a battery 1000 for a motor installed in a vehicle 1 such as an automobile, as shown schematically in FIG. 11. Specific examples of applications include the power supply (secondary battery) of an automobile equipped with an electric motor, such as hybrid automobiles, electric automobiles, and fuel cell automobiles.

The invention claimed is:

1. A battery comprising a case in which an opening is formed, and a sealing cap that closes the opening formed in the case,
   wherein the sealing cap is formed from a thin plate that covers the opening in the case, and
   the circumferential edge of the sealing cap is joined to the case, the center of the sealing cap is bent from the circumferential edge and bulges up toward the outside of the case, and a chamfer is applied to a corner bent from the circumferential edge on the inside of the sealing cap.

2. The battery according to claim 1, wherein the sealing cap is a pressed article and the chamfer of the corner is applied by pressing.

3. The battery according to claim 1, wherein the chamfer angle $\theta$ of the chamfer applied to the corner is $30° \leq \theta \leq 60°$, using a bottom face of the circumferential edge of the sealing cap as a reference.

4. The battery according to claim 1, wherein the center comprises a side wall component that is bent upward from the circumferential edge, and a roof component that covers an upper part of the opening in the case.

5. The battery according to claim 4, wherein the roof component is formed flat.

6. The battery according to claim 4, wherein the roof component is thinner than the side wall component.

7. The battery according to claim 6, wherein, when t1 represents the thickness of the side wall component and t2 represents the thickness of the roof component, then $0.9t1 \geq t2 \geq 0.5t1$ is satisfied.

8. The battery according to claim 1, wherein electrolyte and an electrode body comprising a positive electrode and a negative electrode are placed inside the case to constitute a secondary battery.

9. A vehicle comprising the secondary battery according to claim 8 as a power supply.

\* \* \* \* \*